United States Patent [19]

Shrawder et al.

[11] Patent Number: 4,546,627
[45] Date of Patent: Oct. 15, 1985

[54] CABLE LOCKING MECHANISM

[76] Inventors: Carl F. Shrawder; Peter Randall, both of 14934 Stonesboro Pl., Sherman Oaks, Calif. 91403

[21] Appl. No.: 497,170

[22] Filed: May 23, 1983

[51] Int. Cl.[4] ............................................. E05B 73/00
[52] U.S. Cl. .................................................... 70/18
[58] Field of Search .................. 70/14, 15, 18, 30, 49, 70/53, 58; 24/115 H, 115 K, 115 G, 115 R, 135 R, 30.5 R, 30.5 T, 481–483

[56] References Cited

U.S. PATENT DOCUMENTS

| 2,709,438 | 5/1955 | Murray | 24/115 H |
| 4,249,716 | 2/1981 | Barron | 24/481 X |

FOREIGN PATENT DOCUMENTS

| 142257 | 6/1935 | Austria | 70/18 |
| 243675 | 3/1965 | Austria | 24/115 H |
| 2556352 | 6/1977 | Fed. Rep. of Germany | 70/18 |

Primary Examiner—Gary L. Smith
Assistant Examiner—Thomas J. Dubnicka
Attorney, Agent, or Firm—Lyon & Lyon

[57] ABSTRACT

An inexpensive cable locking mechanism adapted for use with a conventional padlock which is comprised of a male handle portion having a pair of apertures extending axially therethrough, a tubular female member adapted for threaded engagement with the male portion and having a pair of apertures in the extended end thereof, and a flexible cable. The cable extends through one of the apertures in the handle, through the tubular female portion and out one of the apertures in the extended end thereof, loops about the object or objects to be secured and extends back through the other aperture in the extended end of the female member, through the tubular portion thereof and out the other aperture in the male handle portion of the lock. Upon pulling the extended loop tightly about the object to be secured and rotating the male handle portion of the lock with respect to the female portion, the cord is tightly twisted within the tubular portion of the female member thereby preventing withdrawal of the cord through either the apertures in the locking handle or the apertures in the female portion of the locking mechanism. The tubular female portion of the locking mechanism is provided with a flange having an aperture therein adapted to receive the shackle on a padlock which, when secured, is operative between the male handle portion and tubular female portion of the lock to prevent relative movement therebetween, thereby securing the cable loop in place about the secured object or objects.

5 Claims, 4 Drawing Figures

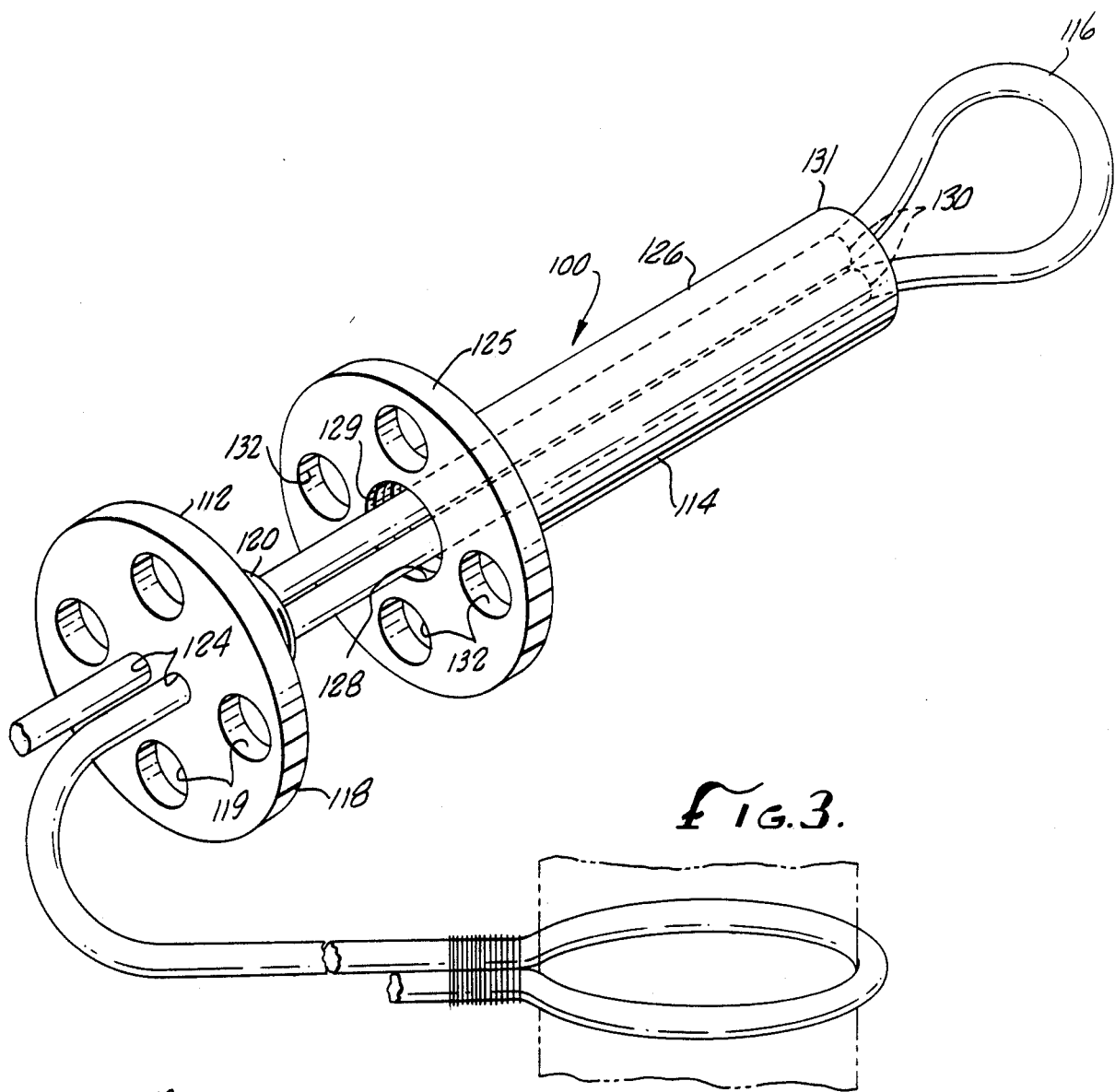
*f*IG.3.
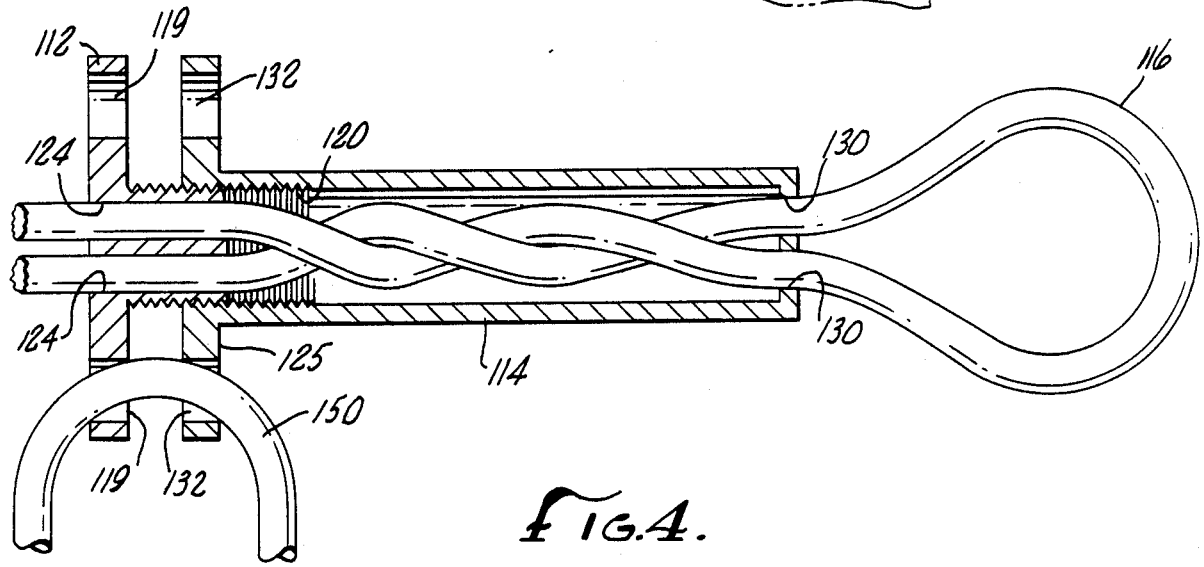
*f*IG.4.

4,546,627

CABLE LOCKING MECHANISM

BACKGROUND OF THE INVENTION

Over the years numerous locking devices have been developed for securing large objects of varying configurations. Some objects such as surfboards present a particularly difficult locking problem due to the lack of any attachments or portions thereof which can readily accommodate a locking mechanism. The solutions to the surfboard problem as well as the problem of securing other large, awkwardly configured items have been the cable lock. The conventional cable lock is comprised of a steel cable which defines a pair of loops formed at the extended ends thereof which receive the shackle of a padlock. Such devices are restrictive for many applications due to the fixed size of the loop. Accordingly, if the loop has to be tightly secured about an object, such cable locks would have to be specifically sized for the particular object to be adequately secured. Surfboards and skis are examples of such items. In the case of a surfboard, the cable would have to fit about the board just forward of the skag and be sized such that it could not be slighted over the larger center portion of the board and, of course, different surfboards are of different sizes.

To solve this problem cable locks have been developed which utilize particularly configured cables which cooperate with locking mechanisms designed specifically for such cables. U.S. Pat. No. 3,590,608 is an example of such a cable lock mechanism. Such devices, however, are somewhat expensive and are often susceptible to unauthorized forced opening. It would be highly desirable to provide a cable locking mechanism which was variable in length and highly versatile in use yet of inexpensive construction and not easily forced open. Such a mechanism is disclosed herein.

SUMMARY OF THE INVENTION

Briefly, the present invention comprises of inexpensive cable locking mechanism particularly adapted for use in securing objects of varying sizes which is comprised of a cable, handle member having a pair of space apertures extending axially therethrough and a tubular member having a pair of spaced apertures in the extended end thereof which is adapted for threaded engagement with the handle member, and means for securing the tubular member to the handle for preventing relative rotation thereof such that upon looping the cable about the object or objects to be secured, extending the ends of the cable through the spaced apertures in the extended end of the tubular member, back through the tubular member and out the two apertures in the handle, rotating the handle member with respect to the tubular member so as to twist the cable within the tubular member and securing the locking means to prevent further relative rotation of the handle and tubular members, the twisted cable is held firmly within the tubular member thereby securing the cable in place about the surrounded object.

It is therefore the principal object of the present invention to provide a cable locking mechanism for securing one or more objects together and/or to a fixed object which mechanism is highly versatile in its application, simple to use and inexpensive to manufacture.

It is another object of the present invention to provide a cable locking mechanism which is highly resistant to tampering.

It is yet another object of the present invention to provide a locking mechanism adaptable for securing surfboards to a fixed object.

These and other objects and advantages of the present invention will become apparent from the following detailed description taken in conjunction with the accompanying drawings.

BRIEF DESCRIPTION OF THE DRAWINGS

FIG. 3 is a perspective view of a second embodiment of the present invention.

FIG. 4 is a cross-sectional view of the second embodiment of the present invention shown in the locked position.

DESCRIPTION OF THE PREFERRED EMBODIMENT

Figure 1:
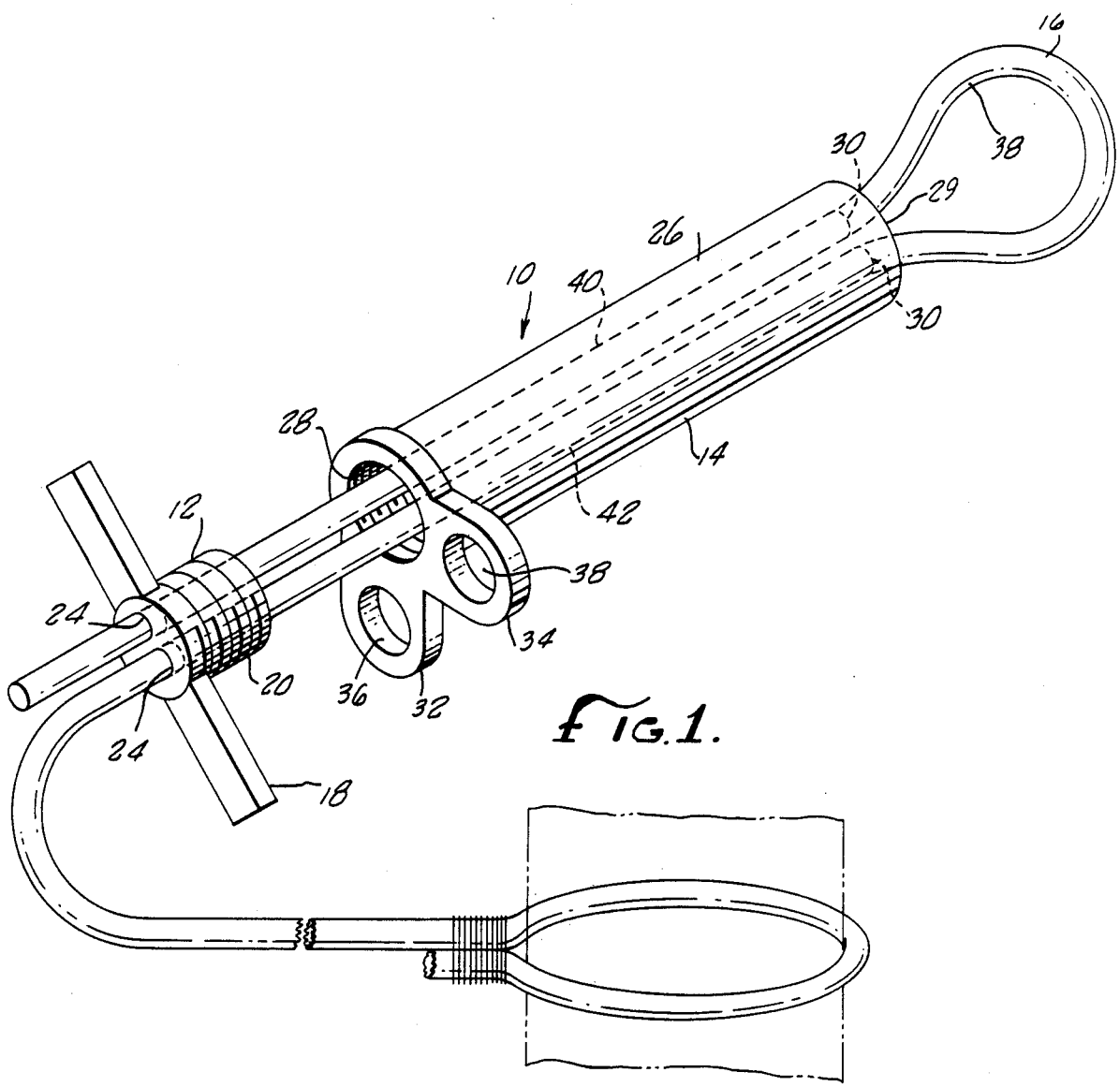
FIG. 1 is a perspective view of the locking mechanism of the present invention.

The cable locking mechanism 10 of the present invention is comprised of a male handle member 12, female tubular member 14 and conventional steel cable 16. The handle member 12 is comprised of a cross-bar 18 and tubular threaded extension 20. The extension 20 has a pair of spaced axially disposed apertures 24 extending therethrough. The female tubular member 14 is comprised of a tubular extension 26 having an open end 28 adapted for threaded engagement with the extension 20 and handle member 12 and a closed end 29 having a pair of spaced axially disposed apertures 30 therein. The female member 14 also defines a pair of radial flanges 32 and 34 welded or otherwise suitably affixed to the tubular member 14 adjacent its open end 28 having apertures 36 and 38 therein preferably disposed approximately 90 degrees apart.

Figure 2:
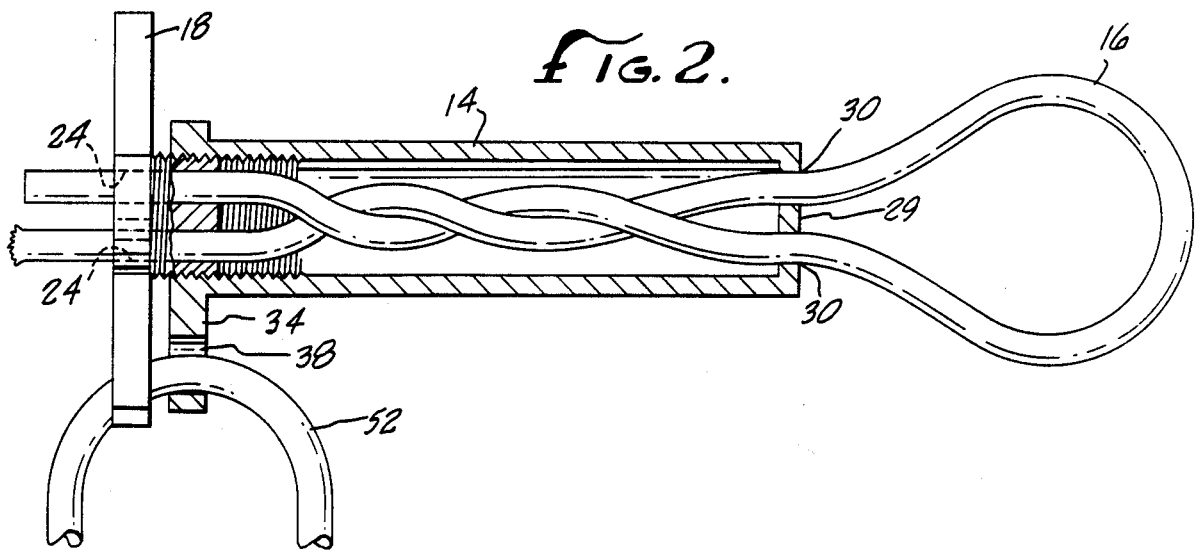
FIG. 2 is a cross-sectional view of the locking mechanism of the present invention shown in the locked position.

In use, the cable 16 extends through the handle member 12 passing through apertures 24 therein, the tubular female member 14 passing through apertures 30 therein and defines a loop 38 intermediary of its ends, as seen in FIG. 1. In this disposition, the cable 16 defines two parallel lengths 40 and 42 which pass through the handle and tubular members 12 and 14. The cable is then disposed about the object or objects to be secured, e.g. surfboard, skis, etc., (not shown) and pulled back through the handle and tubular members so as to tighten the loop about the objects. The handle member 12 is then rotated with respect to the tubular member 14. By virtue of the lengths 40 and 42 of the cable each passing through apertures 24 and 30, rotation of the handle member 12 with respect to the tubular member 14 causes the cable to twist within the tubular member as seen in FIG. 2. After the cable is twisted sufficiently to adequately tighten the loop about the object or objects to be secured, a conventional padlock is secured between the handle and tubular member to prevent further rotation thereof and thereby secure the cable in place. In the embodiment illustrated in FIGS. 1 and 2, the shackle 52 of padlock extends through the aperture 36 or 38 in one of the flanges 32 or 34 on the tubular member 14 which would then best be in a position to limit counter-clockwise rotation of the handle with respect to the tubular member. Locking the shackle within the case of the lock will prevent sufficient rotation of the handle member with respect to the tubular member to loosen the loop about the secured object.

FIGS. 3 and 4 illustrate another embodiment of the present invention. As seen therein, locking mechanism 100 is comprised of a disc-shaped male handle member 112, a female tubular member 114 and a conventional cable 116. The handle member 112 is comprised of a disc-shaped body portion 118 and a tubular threaded extension 120, the body portion 118 and extension 120 having a pair of spaced-axially disposed apertures 124 therein. The disc-shaped body portion 118 also has a plurality of apertures 119 extending therethrough. The female tubular member 114 is comprised of a disc-shaped base portion 125 and a tubular portion 126 extending therefrom. The open end 128 of the tubular portion 114 is threaded at 129 for engagement with the extension 120 on the handle member 112. The tubular extension 126 has a closed end 131 having a pair of spaced-axially disposed apertures 130 therein. The disc-shaped base portion 125 of the female tubular member 114 defines a plurality of apertures 132 therein as seen in FIG. 3.

The use of the second embodiment of the present invention is the same as that of the first embodiment except that the tubular female portion 114 is secured to the handle member 112 by means of a conventional padlock with the shackle 150 thereof extending through any aligned pair of apertures 119 in the disc-shaped portion 118 of handle member 112 and the disc-shaped base portion 125 of the tubular handle member 114.

Various changes and modifications such as incorporating a locking mechanism into the cable locking mechanism may be made in carrying out the present invention without departing from the spirit and scope thereof. Insofar as the changes and modifications are within the purview of the appended claims, they are to be considered as part of the present invention.

I claim:

1. A locking mechanism adapted for use with a padlock for securing together one or more objects, said mechanism comprising: a first locking member including a radially extending handle portion and an axially extended threaded engagement portion secured to said handle portion and having a pair of spaced apertures extending radially therethrough; a second locking member including an axially extended hollow tubular portion having an open end and a closed end, said closed end having a pair of spaced apertures extending axially therethrough and said open end being adapted for threaded engagement with said engagement portion of said first locking member and a flange portion secured to and extending radially from said tubular portion adjacent said open end thereof, said flange portion having at least one aperture therein; and a flexible cable adapted to be extended through one of said apertures in said threaded engagement portion of said first locking member, through said tubular portion of said second locking member and out one of said apertures in said closed end thereof and looped back through the other of said apertures, through said tubular portion and out the other of said aperture in said threaded engagement portion of said first locking member so as to slidably dispose said first and second locking members on said cable and define a securement loop externally adjacent the closed end of said tubular portion of said second locking member such that upon disposing the securement loop about the objects to be secured, sliding said first and second locking members along said cable to tighten said securement loop about said objects, rotating said handle portion of said first locking member with respect to said second locking member so as to twist said cable within said tubular portion of said second locking member and disposing said padlock about a portion of said handle and through said aperture in said flange portion of said second locking member, said loop is tightly secured about said objects in a fixed disposition with respect to said first and second locking members.

2. A locking mechanism for securing an object, or two or more objects together comprising: a first locking member having a pair of spaced apertures extending axially therethrough and defining a first radial flange; a second locking member adapted for threaded engagement with said first locking member and defining a second radial flange and a hollow tubular axial extension terminating in a closed end, said end having a pair of spaced apertures extending axially therethrough; said first and second locking members including means for threadably engaging said members; a flexible cable adapted to be extended through one of said apertures in said first locking member, through said extension of said second locking member, out one of said apertures in said closed end thereof and looped back through the other of said apertures in said closed end, through said extension and out said other aperture in said first locking member so as to slidably dispose said locking members on said cable and define a securement loop extending from the closed end of said second locking member; and means defined by at least one of said flanges for use in securing said flanges to restrict the relative rotational movement of said locking members whereby upon disposing the securement loop defined by said cable about an object to be secured, sliding said first and second locking members along said cable to tighten the securement loop about said object, rotating one of said locking members with respect to the other and securing said locking members to restrict relative rotational movement therebetween, said cable is secured about said object.

3. The combination of claim 2 wherein said first radial flange comprises a handle, said second radial flange defines an aperture extending therethrough and including a locking means adapted to be secured to said second radial flange through said aperture adjacent said handle to restrict relative rotation between said first and second locking members.

4. The combination of claim 2 wherein said first radial flange defines a plurality of apertures therein spaced about said first locking member and said second radial flange defines a plurality of apertures therein spaced about said second locking member and including a locking means adapted to extend through one of said apertures in each of said radial flanges to restrict relative rotation of said flanges and said locking members.

5. A locking mechanism for securing an object, or two or more objects together comprising: a first locking member having a pair of spaced apertures extending axially therethrough and defining a first radial flange; a second locking member defining an axially extended hollow tubular portion having an open end and a closed end, said closed end having a pair of spaced apertures extending axially therethrough and a flange portion secured to and extending radially from aid tubular portion adjacent the open end thereof, at least one of said radial flanges defining an aperture therein, a flexible cable adapted to extend through one of said apertures in said first locking member, through said extension of said second locking member, out one of said apertures in said closed end thereof and looped back through the other of said apertures in said closed end, through said extension and out said other aperture in said first locking member so as to slidably dispose said locking members on said cable and define a securement loop extending from the closed end of said second locking member; and locking means adapted to extend through said aperture in one of said radial flanges to prevent relative rotation of said radial flanges and said locking members whereby upon disposing the securement loop defined by said cable about an object to be secured, sliding said first and second locking members along said cable to tighten the securement loop about the object, rotating one of said locking members with respect to the other and securing said locking means to restrict relative rotational movement between said first and second locking members, said cable is secured about the object.

* * * * *